(12) United States Patent
Takishita et al.

(10) Patent No.: US 6,599,607 B1
(45) Date of Patent: Jul. 29, 2003

(54) OPTICAL RECORDING MEDIUM

(75) Inventors: Toshihiko Takishita, Yamanashi (JP); Masahiro Kato, Tokorozawa (JP); Eiji Muramatsu, Tokorozawa (JP); Kunihiko Horikawa, Tokorozawa (JP); Shoji Taniguchi, Tokorozawa (JP); Atsushi Yamaguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/544,551

(22) Filed: Apr. 6, 2000

(30) Foreign Application Priority Data

Apr. 8, 1999 (JP) .......................................... 11-101465

(51) Int. Cl.⁷ .............................. B32B 3/02; G11B 7/24
(52) U.S. Cl. .................... 428/64.4; 428/64.1; 428/64.2; 369/275.4
(58) Field of Search .............................. 428/64.4, 64.1, 428/64.2; 369/275.4

(56) References Cited

U.S. PATENT DOCUMENTS

| | | | | |
|---|---|---|---|---|
| 5,898,663 A | * | 4/1999 | Miyamoto et al. | 369/275.4 |
| 6,054,199 A | * | 4/2000 | Sugiyama et al. | 428/64.1 |
| 6,064,644 A | * | 5/2000 | Miyamoto et al. | 369/275.4 |
| 6,075,761 A | | 6/2000 | Akiyama et al. | |

FOREIGN PATENT DOCUMENTS

| | | |
|---|---|---|
| EP | 800165 | 10/1997 |
| JP | 9-035334 | 2/1997 |
| JP | 9-106579 | 4/1997 |

OTHER PUBLICATIONS

Patent Abstracts of Japan, vol. 013, No. 188 (P–866), May 8, 1989 (JP 1–014,743).
Patent Abstracts of Japan, vol. 1995, No. 06, Jul. 31, 1995 (JP 7–073,509).
Patent Abstracts of Japan, vol. 1997, No. 06, Jun. 30, 1997 (JP 9–035,334).

* cited by examiner

*Primary Examiner*—Cynthia H. Kelly
*Assistant Examiner*—L. Ferguson
(74) *Attorney, Agent, or Firm*—Sughrue Mion, PLLC

(57) ABSTRACT

An optical recording medium is designed to generate a read signal free from waveform distortion during reproduction of information. The optical recording medium is formed with information tracks on which data pits carrying information data is to be formed, and prepit tracks previously formed with a plurality of prepits. Each of the information tracks and each of the prepit tracks are positioned adjacent to each other, and each of the prepits is formed to be spaced apart from adjacent information tracks in at least its bottom part.

6 Claims, 6 Drawing Sheets

RADIAL DIRECTION OF DISC

OPTICAL RECORDING MEDIUM

BACKGROUND OF THE INVENTION

1. Field of the Invention

The present invention relates to an optical recording medium which allows a user to record information data.

2. Description of the Related Art

Currently, a write-once type DVD (Digital Versatile Disc)-R and a rewritable DVD-RW have been commercially produced as optical recording media.

FIG. 1 is a perspective view illustrating the structure of a recording surface and a cross section of a DVD-R or a DVD-RW (hereinafter simply referred to as the "DVD") before information data is recorded thereon.

As illustrated in FIG. 1, convex (when viewed from the view point of the figure) groove tracks GV and concave (similarly, when viewed from the view point of the figure) land tracks LD are spirally or concentrically formed in alternation on a recording layer R of the DVD. As shown in FIG. 1, the DVD has a trasparent substrate B which attaches to the recording layer R at the substrate's surface having the groove and land tracks.

The land tracks LD are provided with a plurality of previously formed land prepits LPP for use by a DVD recorder (not shown) as addresses for recognizing particular positions on the groove tracks GV and as a recording timing when the DVD recorder records information data (audio data, video data, and computer data). Each of the land prepit LPP is formed to connect two adjacent groove tracks GV, and its bottom surface (indicated by hatching) is continuous with the bottom surfaces (similarly, indicated by hatching) of associated groove tracks.

For recording information data on the DVD as described above, the DVD recorder irradiates a recording beam to the bottom surfaces of groove tracks GV in accordance with the information data. In this process, heat is conducted over a region of the groove tracks GV irradiated with the recording beam, causing the formation of data pits PT in the heated region as illustrated in FIG. 2. In other words, trains of data pits carrying the information data are formed on the groove tracks GV.

However, when the recording beam from the DVD recorder is irradiated to a position including a land prepit LPP on a groove track GV, a deformed information pit PTX is formed as illustrated in FIG. 2. This is because the heat generated when the recording beam is irradiated also affects a portion of the land prepit LPP.

Thus, when information data is reproduced from the DVD having a recording configuration as illustrated in FIG. 2, waveform distortion occurs particularly in a read signal generated by reading the above-mentioned deformed pit PTX, resulting in a higher read error rate.

OBJECT AND SUMMARY OF THE INVENTION

The present invention has been made in view of the problem mentioned above, and an object is to provide an optical recording medium which is capable of producing a read signal less waveform distortion when information is reproduced therefrom.

An optical recording medium according to the present invention is formed with information tracks on which data pits carrying information data is to be formed, and prepit tracks previously formed with a plurality of prepits. The information tracks and the prepit tracks are formed adjacent to each other, and at least a bottom part of each of the prepits is formed spaced apart from the information tracks.

DETAILED DESCRIPTION OF THE EMBODIMENT

An embodiment of the present invention will hereinafter be described in detail with reference to the accompanying drawings.

Figure 3:
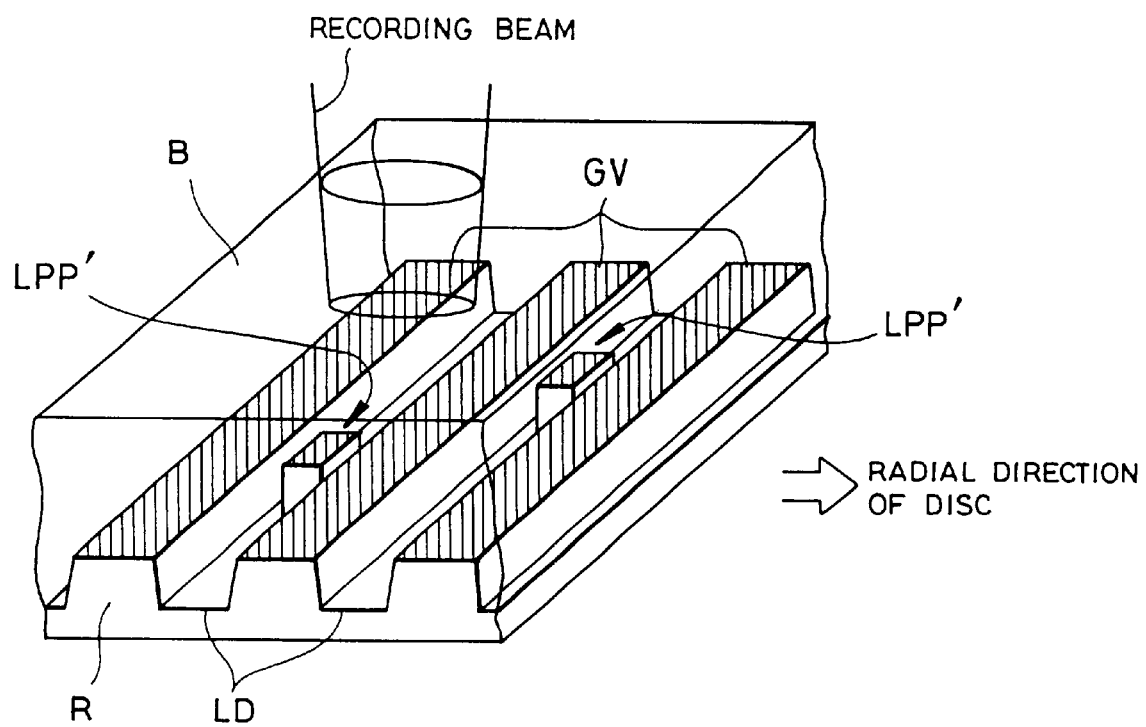
FIG. 3 is a perspective view illustrating a recording surface and a cross section of a write-once or rewritable DVD according to the present invention.

FIG. 3 is a perspective view illustrating the structure of a recording surface and a cross section of a write-once or rewritable DVD according to the present invention as an optical recording medium. FIG. 3 illustrates the configuration of the DVD before information data is recorded by a DVD recorder (not shown).

Figure 1:
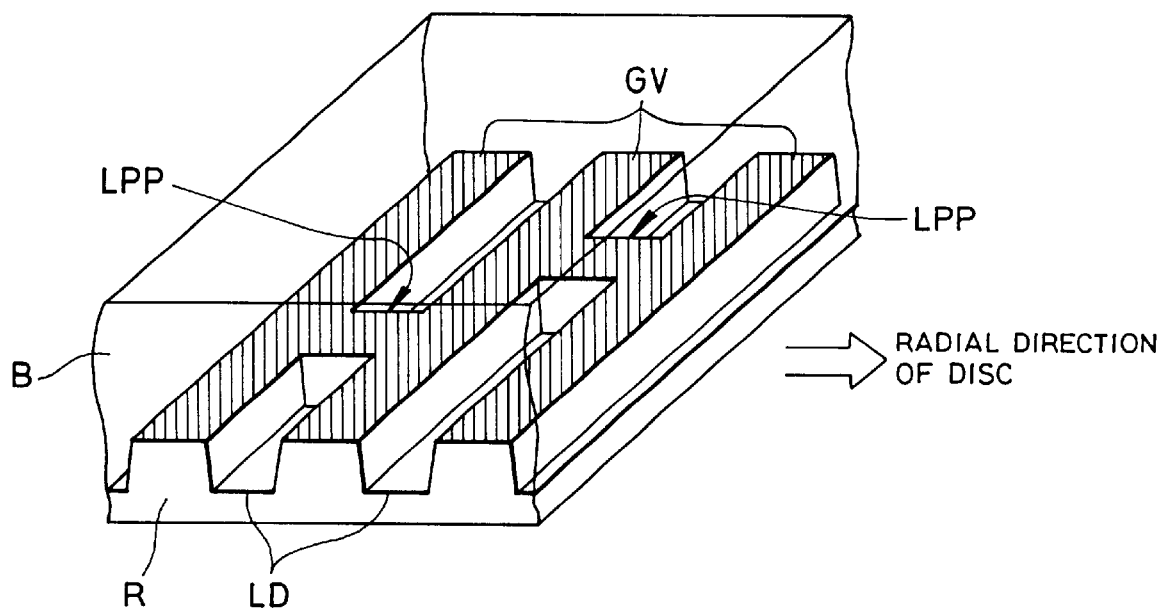
FIG. 1 is a perspective view illustrating a recording surface and a cross section of a conventional write-once or rewritable DVD.
Figure 2:
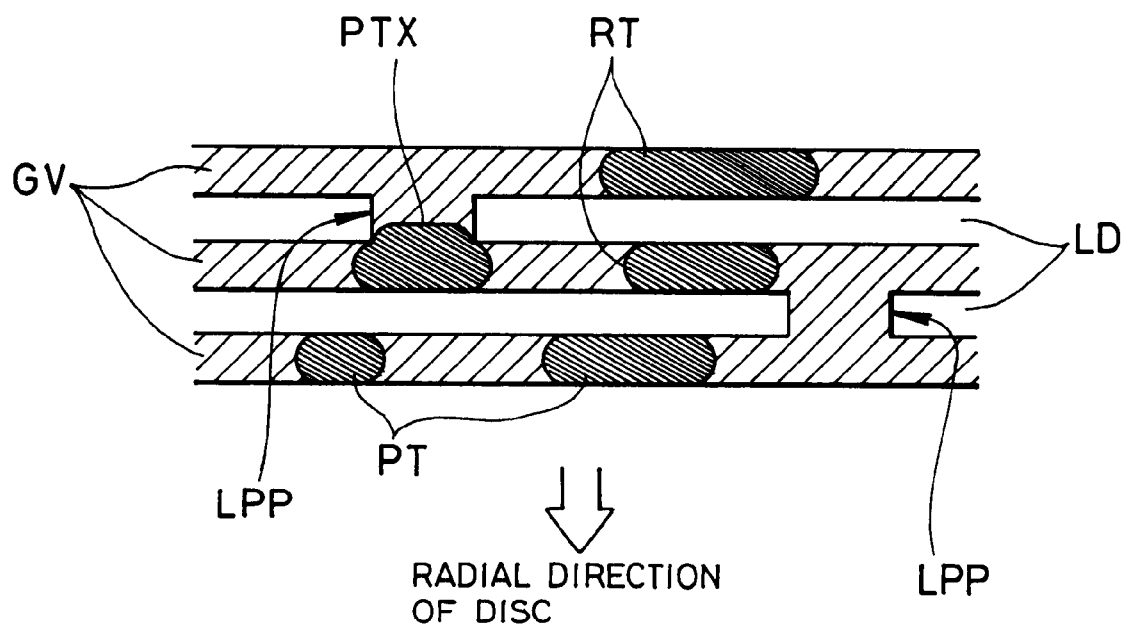
FIG. 2 is a diagram illustrating an exemplary topology on a recording surface when data pits are formed on the DVD illustrated in FIG. 1.

As illustrated in FIG. 3, the recording surface of the DVD is spirally or concentrically formed with convex (when viewed from the view point of the figure) groove tracks GV and concave (similarly, when viewed from the view point of the figure) land tracks LD in alternation. As in the arrangement shown in FIG. 1, the DVD has a transparent substrate B which attaches to the recording layer R at the substrate's surface having the groove and land tracks.

When a DVD recorder records information data (audio data, video data, and computer data) on the DVD, trains of data pits carrying the information data are formed on the groove tracks GV.

The land tracks LD in turn are previously formed sporadically with a plurality of isolated land prepits LPP' serving as addresses for recognizing particular positions on the groove tracks GV, and recording timing which are used by the DVD recorder when it records information data on the DVD.

With the conventional arrangement, the land prepit forms a portion of the land tracks LD susceptible to the conduction of heat caused by an optical beam irradiated to groove tracks GV. According to the present invention, each of the land prepits is formed, as can be seen in FIGS. 3 and 4, as an isolated or island-like land prepit LPP' that is formed to be spaced apart from each of two adjacent groove tracks GV by a predetermined distance.

Figure 4:
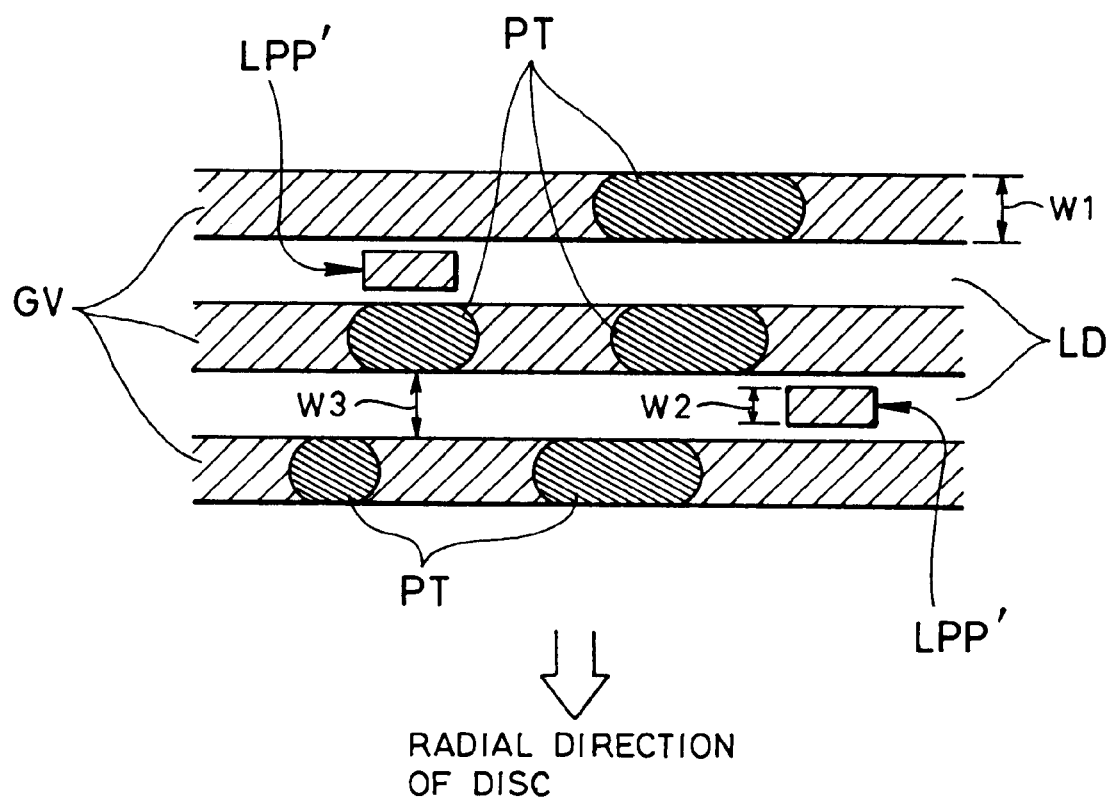
FIG. 4 is a diagram illustrating an exemplary configuration on a recording surface when data pits are formed on the DVD according to the present invention.

In other words, the width $W_2$ of the land prepit LPP' in the disc's radial direction is made narrower than the width $W_3$ of the land track LD as shown in FIG. 4, thereby the land prepits LPP' is formed as an isolated land prepit which is separated from the groove tracks GV. In FIG. 4, the width of the groove tracks GV is denoted by $W_1$.

The isolated land prepits LPP thus formed will not affected by head generated by a recording beam in accordance with information data, for example, even if a portion of a groove track GV close to a land prepit LPP' is irradiated therewith. Thus, as illustrated in FIG. 4, recorded data pits PT can be formed even near the land prepits LPP' on the groove track GV without suffering from deformation.

For manufacturing DVDs having a configuration as illustrated in FIG. 3, it is necessary to create a master disc which is formed with concave groove tracks GV and isolated prepits LPP'. The creation of this master disc involves creating a mask pattern having the respective groove tracks GV and isolated land prepits LPP' in the illustrated configuration by laser cutting. In this process, the width of the land prepit LPP' in the radial direction of the disc should be smaller than the track pitch of the groove tracks GV. Thus, the creation of the mask pattern for the land prepits LPP' requires a cutting beam having a smaller diameter than that which is irradiated for creating the mask pattern for the groove tracks GV.

Figure 5:
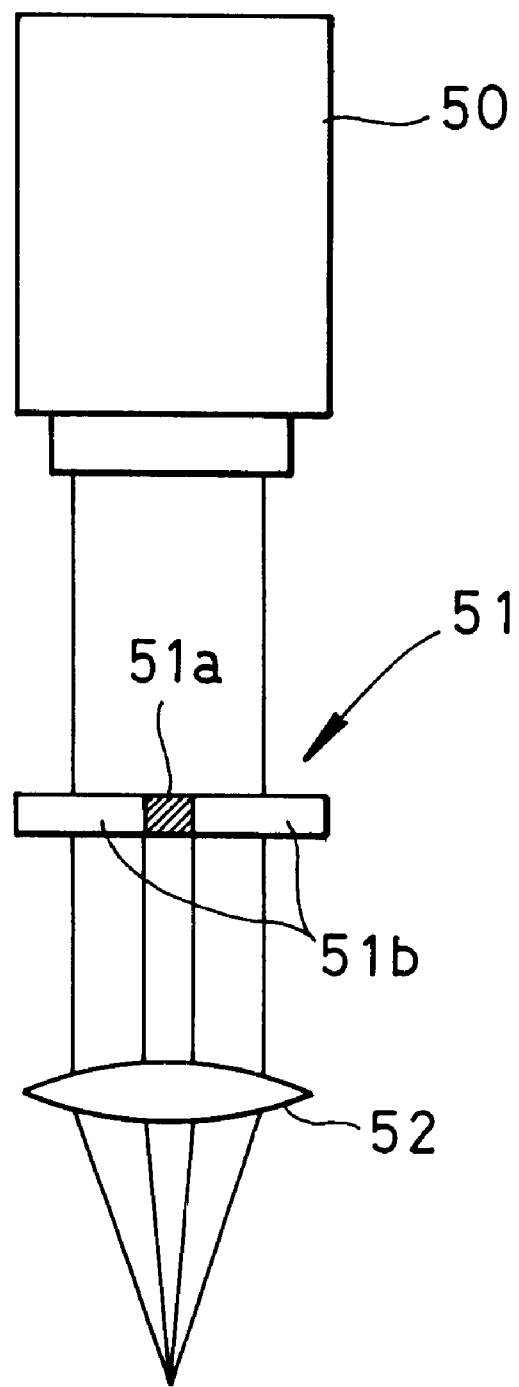
FIG. 5 is a diagram illustrating an exemplary configuration of an LPP cutting beam generator.

FIG. 5 illustrates an exemplary configuration of an LPP cutting beam generator which may be used to create the mask pattern for the land prepits LPP'.

In FIG. 5, laser light generated by a laser oscillator 50 is directed to an objective lens 52 through a laser intensity distribution correcting element 51. The laser intensity distribution correcting element 51 consists of a transmitting area 51b which transmits the laser beam, and a blocking area 51a which blocks the same. The blocking area 51a is positioned such that its center substantially matches the center of the laser light. The objective lens 52 converges the laser light directed thereto through the laser strength distribution correcting element 51, and irradiates a mask material (not shown) with the converged laser light as a cutting beam. Since the intensity of the laser light is reduced in a central portion by the laser intensity distribution correcting element 51 as compared with a peripheral portion, the laser beam converged by the objective lens 52 is reduced in beam diameter.

In this way, the LPP cutting beam generator illustrated in FIG. 5 utilizes a super-resolution phenomenon to reduce the beam diameter of the cutting beam.

While the DVD shown in the foregoing embodiment is formed with convex groove tracks GV and concave land tracks LD, their shapes may be reversed. Specifically, the DVD may be formed with concave groove tracks GV and convex land tracks LD. With such a DVD, data pits PT carrying information data will be formed on the land tracks LD, while isolated groove prepits are previously formed on the groove tracks GV in place of the land prepits LPP'.

Figure 6:
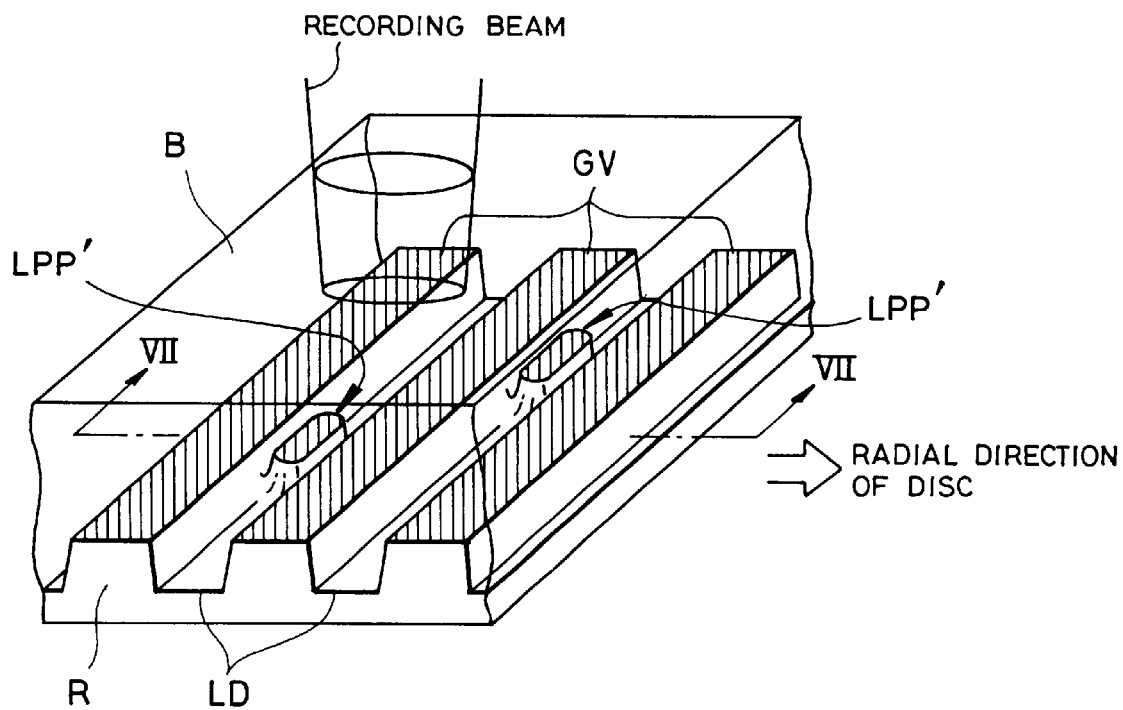
FIG. 6 is a perspective view illustrating a recording surface and a cross section of another example of the write-once or rewritable DVD according to the present invention.
Figure 7:
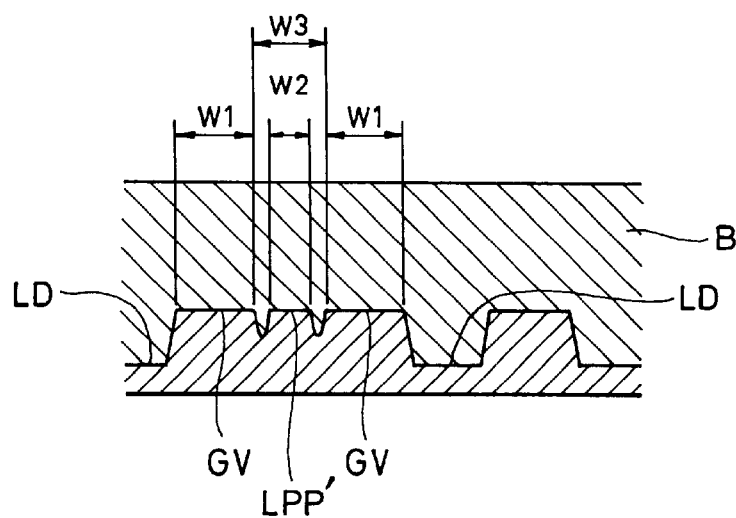
FIG. 7 is a view showing a cross-section taken along a line VII—VII in FIG. 6.

FIG. 6 shows another example of the land prepits LPP'. In this example, the land prepits LPP' are formed at similar positions as those of the land prepits LPP' shown in FIG. 3. As shown in FIGS. 6 and FIG. 7 showing a cross-section taken along the line VII—VII in FIG. 6, each of the land prepits LPP' is formed in a manner that a bottom part thereof is spaced apart from the groove tracks GV while the land prepit LPP' connects to the groove tracks GV at about a middle position in its depth. As shown in FIG. 7, the width $W_2$ of the bottom part of the land prepit LLP' in a radial direction of the disc is made smaller than the width $W_3$ of the landtrack LD, that is, the width of the space between a pair of groove tracks GV. With this configuration, the bottom part of each of the land prepits LPP' is spaced apart from the groove tracks GV.

The land prepits LPP' shown in FIGS. 6 and 7 are formed by reducing the diameter of the cutting beam in a manner similar to that explained by referring to FIG. 5.

According to this embodiment, the height of the wall formed between the groove track GV and the land prepit LPP' is lower than that in the embodiment shown in FIG. 3. Although the effect to prevent conduction of heat generated by the irradiation of the recording beam to the land prepit LPP' becomes smaller in the configuration shown in FIGS. 6 and 7, an advantage exists that the substrate B can be formed relatively easily. As a result of the easiness of the formation of the substrate B, variation of the height of the wall that defines the side face of a land prepit becomes small among the disks, so that the uniformity of a land prepit reading signal can be improved.

As described above, according to the optical recording medium of the present invention, since prepits are not affected by the heat generated by a recording beam irradiated in accordance with information data, data pits carrying information data are formed in normal shape. Thus, a read signal free from waveform distortion is advantageously produced from the optical recording medium.

The present invention is not limited to the above embodiments, but various modifications are possible. For example, in the case of the above embodiments, a bottom part of each of the land prepits LPP' is formed spaced apart from two groove tracks GV which sandwich it. However, each of the land prepits LPP' can be formed spaced apart from only one of the two groove tracks GV and connected to the remaining one of the groove tracks GV.

What is claimed is:

1. An optical recording medium comprising:

information tracks on which data pits carrying information data is to be formed; and prepit tracks previously formed with a plurality of prepits, wherein each of said information tracks is formed adjacent to each of said prepit tracks in a radial direction of said recording medium, and each of said prepits is connected to at least one of said information tracks to a middle of a depth of each of said prepits.

2. An optical recording medium according to claim 1, wherein said information tracks are groove tracks on said optical recording medium, said prepit tracks are land tracks on said optical recording medium, and said prepits are land prepits on said optical recording medium.

3. An optical recording medium comprising:

information tracks on which data pits carrying information data is to be formed; and prepit tracks previously formed with a plurality of prepits, wherein each of said information tracks has a width, in a radial direction of said recording medium, larger than that of each of said prepits, and further wherein a radial line extending from a center of the optical recording medium to an outer circumference thereof intersects at least one data pit and one prepit.

4. An optical recording medium comprising:

information tracks on which data pits carrying information data is to be formed; and prepit tracks previously formed with a plurality of prepits, wherein each of said information tracks has a width, in a radial direction of said recording, medium, larger than that of each of said prepits, and wherein each of said prepits is connected to at least one of said information tracks at a middle of a depth of each of said prepits.

5. An optical recording medium according to claim 3, wherein said information tracks are groove tracks on said optical recording medium, said prepit tracks are land tracks on said optical recording medium, and said prepits are land prepits on said optical recording medium.

6. An optical recording medium according to claim 3, wherein the width of at least one of said plurality of prepits is smaller than a pitch between said information tracks.

\* \* \* \* \*